(12) United States Patent
Calin et al.

(10) Patent No.: US 7,805,142 B2
(45) Date of Patent: Sep. 28, 2010

(54) METHODS AND DEVICE FOR VARYING A HAND-OFF BASE STATION LIST BASED ON TRAFFIC CONDITIONS

(75) Inventors: Doru Calin, Manalapan, NJ (US); Thomas Brian Morawski, Westfield, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 562 days.

(21) Appl. No.: 10/815,797

(22) Filed: Apr. 2, 2004

(65) Prior Publication Data
US 2005/0239466 A1 Oct. 27, 2005

(51) Int. Cl.
*H04W 36/00* (2009.01)
(52) U.S. Cl. .................. 455/437; 455/436; 455/434; 455/453; 370/331
(58) Field of Classification Search ......... 455/436–439, 455/442, 434, 561, 453, 452.1, 67.11, 423; 370/331–333, 229, 232, 230.1, 237
See application file for complete search history.

(56) References Cited

U.S. PATENT DOCUMENTS

| | | | | |
|---|---|---|---|---|
| 5,490,204 A | * | 2/1996 | Gulledge ................ 455/423 |
| 5,640,414 A | * | 6/1997 | Blakeney et al. ........... 375/130 |
| 5,640,676 A | * | 6/1997 | Garncarz et al. ........... 455/436 |
| 5,724,665 A | | 3/1998 | Abbasi et al. |
| 5,796,722 A | * | 8/1998 | Kotzin et al. .............. 370/252 |
| 5,854,981 A | | 12/1998 | Wallstedt et al. |
| 5,915,221 A | * | 6/1999 | Sawyer et al. ............. 455/437 |
| 5,999,522 A | * | 12/1999 | Rohani .................... 370/331 |
| 6,014,565 A | * | 1/2000 | Bonta ..................... 455/437 |
| 6,049,715 A | * | 4/2000 | Willhoff et al. ............ 455/436 |
| 6,119,005 A | * | 9/2000 | Smolik .................... 455/436 |
| 6,125,280 A | * | 9/2000 | Grandhi et al. ............ 455/446 |
| 6,141,565 A | * | 10/2000 | Feuerstein et al. .......... 455/560 |
| 6,154,655 A | * | 11/2000 | Borst et al. ............... 455/451 |
| 6,173,181 B1 | * | 1/2001 | Losh ...................... 455/434 |

(Continued)

OTHER PUBLICATIONS

Doru Calin and Marc Areny. *Impact of Radio Resource Allocation Policies on the TD-CDMA System Performance: Evaluation of Major Critical Parameters*, IEEE Journal on Selected Areas in Communications, vol. 19, No. 10, Oct. 2001.
3rd Generation Partnership Project; Technical Specification Group Radio Access Networks; RF System Scenarios (Release 4), 3GPP TR 25.942, V4.1.0 (Dec. 2001) Technical Report.
3rd Generation Partnership Project; Technical Specification Group Radio Access Networks; Physical Layer Procedures (TDD) (Release 5), 3GPP TS 25.942, V5.1.0 (Jun. 2002) Technical Report.
3rd Generation Partnership Project; Technical Specification Group Radio Access Networks; User Equipment (UE) radio transmission and reception (TDD) (Release 6), 3GPP TS 25.102, V6.0.0 (Dec. 2003) Technical Report.

*Primary Examiner*—Sharad Rampuria
(74) *Attorney, Agent, or Firm*—Capitol Patent and Trademark Law Firm (57) ABSTRACT

A neighbor list of potential hand-off base stations is varied to control call blocking and dropping rates. The list may be varied in accordance with real-time traffic flow criteria.

9 Claims, 5 Drawing Sheets

U.S. PATENT DOCUMENTS

| | | | |
|---|---|---|---|
| 6,192,244 B1* | 2/2001 | Abbadessa | 455/436 |
| 6,195,552 B1 | 2/2001 | Jeong et al. | |
| 6,285,883 B1* | 9/2001 | Bringby et al. | 455/437 |
| 6,295,450 B1* | 9/2001 | Lyer et al. | 455/436 |
| 6,337,983 B1* | 1/2002 | Bonta et al. | 455/437 |
| 6,400,951 B1* | 6/2002 | Vaara | 455/436 |
| 6,430,414 B1* | 8/2002 | Sorokine et al. | 455/442 |
| 6,445,918 B1* | 9/2002 | Hellander | 455/423 |
| 6,564,058 B1* | 5/2003 | Flewitt et al. | 455/437 |
| 6,725,043 B2* | 4/2004 | Bonta et al. | 455/437 |
| 6,745,033 B1* | 6/2004 | Shah et al. | 455/436 |
| 6,748,222 B1* | 6/2004 | Hashem et al. | 455/453 |
| 6,954,643 B2* | 10/2005 | Petrus | 455/437 |
| 7,027,409 B2* | 4/2006 | Cain | 370/252 |
| 7,215,956 B2* | 5/2007 | Liu et al. | 455/434 |
| 7,389,111 B2* | 6/2008 | Petrus | 455/436 |
| 2002/0150063 A1* | 10/2002 | Tran | 370/332 |
| 2003/0190916 A1* | 10/2003 | Celedon et al. | 455/437 |
| 2004/0266426 A1* | 12/2004 | Marsh et al. | 455/426.2 |

\* cited by examiner

METHODS AND DEVICE FOR VARYING A HAND-OFF BASE STATION LIST BASED ON TRAFFIC CONDITIONS

BACKGROUND OF THE INVENTION

Existing wireless systems are designed to meet certain operational requirements. Two such requirements are call-blocking and call dropping rates. Call blocking rates relate to the percentage of calls originating from wireless devices to a network base station that are blocked, i.e., not accepted, by the base station for any of several possible reasons, such as congestion at the base station. Call dropping rates relate to calls that are initially accepted but are later terminated not at the request of one of the parties to the call but because, for example, the quality of a signal carrying a call which may be voice or data becomes unacceptable.

It is believed that call dropping is more irritating to a wireless caller than a blocked call. That is, someone engaged in an accepted, then dropped, call is more upset when her call is dropped than when she has to wait until a call is finally accepted for connection after being blocked. For this reason, the call blocking rate is usually set higher than the call dropping rate. However, ideally, both call-blocking and call dropping rates should remain relatively low, e.g., ideally 1-2% and 0.1-0.2%, respectively. There is a tradeoff, however, between the two. Statistically, the higher the number of calls that are accepted, i.e., the lower the call blocking rate, the greater the chance that some calls will have to be subsequently dropped not at the request of a party, i.e., the higher the call dropping rate, and vice-versa.

For example, during certain times of the day a base station may experience a large influx of traffic, e.g., incoming telephone calls, that usually adds background interference to a wireless signal between a wireless device and its serving base station(s). This weakens the signal at a faster rate and results in a higher hand-off rate to another base station. In response to such an influx of traffic, (and/or to unrelated causes, such as user mobility patterns) the base station may attempt to hand-off some calls to neighboring base stations listed on a so-called neighbor list (a so-called "network assisted hand-off") or an associated wireless device may attempt to originate a hand-off to another base station on the list ("mobile assisted hand-off"). The neighbor list contains a number of neighboring base stations that are ranked by one or more techniques known in the art. Typically, this ranking is based on a statistical model. The modeling and ranking are usually done when the base station or its associated network is initially deployed and is rarely revised. Typically, when the base station needs to hand-off a call, it first attempts to do so using a base station from the neighbor list that momentarily offers the best available wireless signal to a particular call, or simply by using the highest ranked base station on the neighbor list. Sometimes, however, such a hand-off is not possible because a connection to such a base station is momentarily unavailable (due to traffic congestion at the momentarily preferred base station) or the quality of the signal is unacceptable.

When this occurs, the base station will attempt to hand the call off to another base station on the neighbor list that momentarily offers the second best available wireless signal or simply to the next highest ranked base station. Sometimes, however, the base stations available to accept the hand-off are those that offer a weaker, but still acceptable, signal or those that are lower ranked base stations. Many times after a call is handed-off to such a base station the call is ultimately dropped because the base station that accepted the hand-off cannot maintain the call, e.g., it's too far away from the caller (or the signal drops under an acceptable threshold and cannot return to an acceptable level). In sum, though the signal between the lower ranked base station was momentarily acceptable, it quickly became unacceptable as the wireless user moved or as the traffic conditions associated with the base station changed. In hindsight, it would have been better, i.e., less irritating to block a number of incoming calls than to force a call to be handed-off to a less preferred, momentarily available base station and then be dropped.

Today, call blocking and call dropping rates are based on static neighbor lists, i.e., the lists remain relatively unchanged. This makes it difficult to change these rates as traffic conditions vary.

SUMMARY OF THE INVENTION

We have recognized that it would be advantageous to control call blocking and/or call dropping rates in-real time as traffic conditions vary.

This is achieved, in accordance with the principles of the invention, by measuring, in real-time, traffic flow criteria associated with a wireless device and at least one base station and controlling the effective number of base stations on a neighboring base station list based on the measured criteria.

The traffic flow criteria must be at such a level that calls are handed-off to a base station that can actually serve such calls. Only base stations associated with acceptable real-time traffic criteria are permitted to accept hand-offs. Those that are not associated with acceptable real-time traffic criteria are not permitted to accept hand-offs, and hence are effectively off of the neighboring base station list. The effect is that calls are not handed-off from a current, serving base station to a base station that is listed as ostensibly being able to serve them, but which, in fact cannot practically serve such calls, and would consequently drop such calls shortly after their hand-off. Advantageously, doing so reduces the effective call dropping rate. Furthermore, a base station that cannot hand-off some of the calls because it does not have a base station to hand such calls off to, and so must continue to serve them, remains more loaded than such a base station otherwise would have been had it handed-off such calls. As a result, it is more likely that such a base station will become loaded to the point that it will have to block additional calls from being initiated. Hence the call blocking rate is likely to rise. However, advantageously, letting the call blocking rate rise, rather than the call dropping rate, results in less irritation to callers.

DETAILED DESCRIPTION OF THE INVENTION

Figure 1:
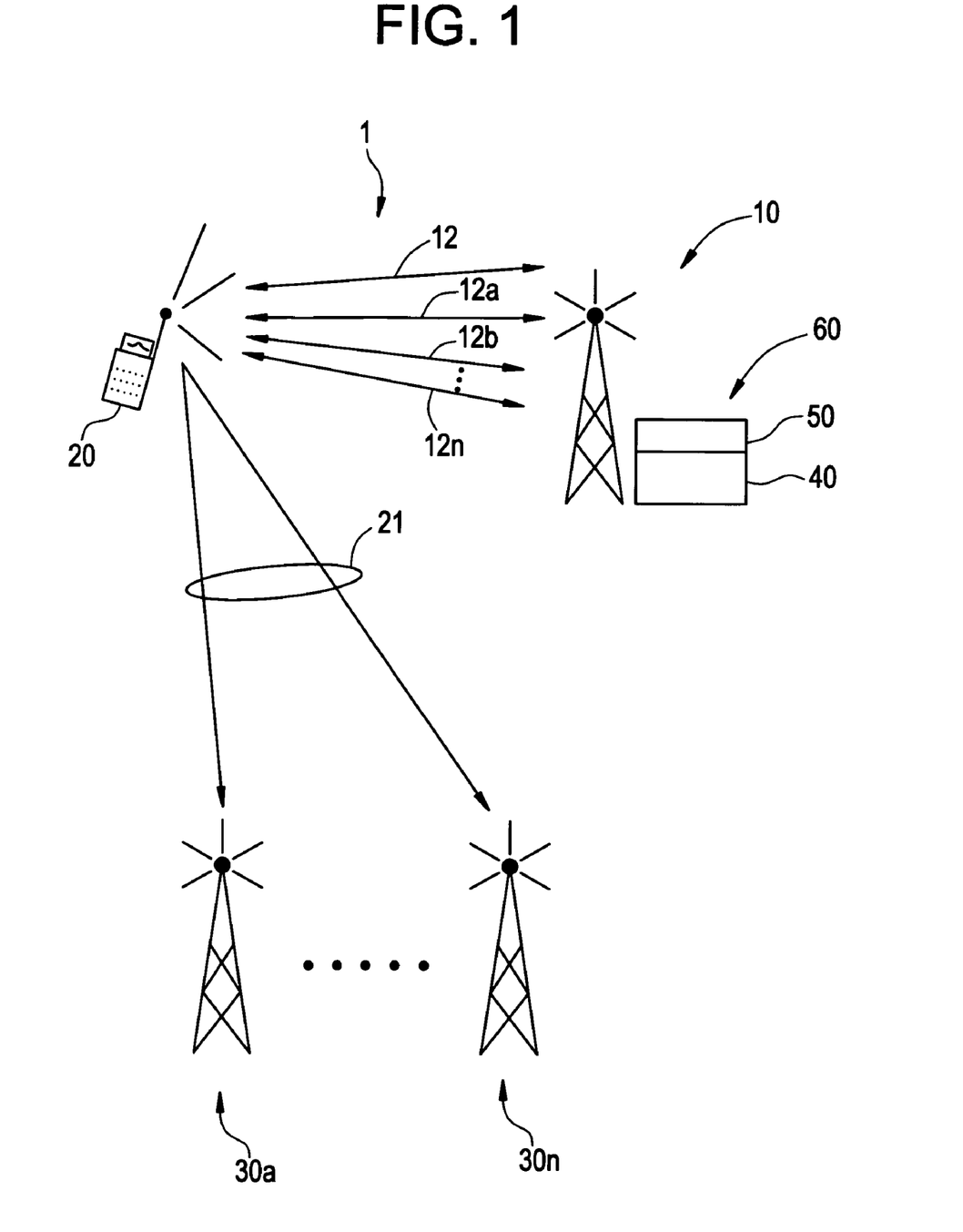
FIG. 1 depicts a simplified diagram of a wireless network, including potential hand-off base stations, according to one embodiment of the present invention.

Referring now to FIG. 1, there is shown a wireless network 1 comprising a wireless or mobile device 20 (collectively "wireless" device), current serving base station 10 for the wireless device 20 and one or more potential hand-off base stations 30a, ... 30n (where "n" indicates the last base station). Though only one wireless device 20 is shown in FIG. 1, it should be understood that a typical wireless network may comprise tens, hundreds, or thousands of such wireless devices. FIG. 1 also shows pathways 12a, 12b, ... 12n between wireless device 20 and base station 10. Depending on the type of wireless technology (e.g., Code Division Multiple Access (CDMA), Time Division Multiple Access (TDMA)) implemented in system 1, device 20 may be served by one (in the case of a TDMA system) base station via pathway 12a or more (in the case of a CDMA system that uses soft hand-offs) base stations via pathways 12b, ... 12n.

In one embodiment of the present invention, base station 10 comprises a control unit 60, such as a Call Admission Control (CAC), for storing and varying a list of potential, hand-off base stations, referred to as the "neighbor" list. The base stations included in this list 50 are a subset of those base stations to which base station 10 is capable of handing-off wireless device 20. Sometimes such a hand-off occurs when the wireless device 20 moves out of the coverage area of the base station 10. Other times it occurs when the base station 10 becomes congested or an original link or pilot signal 12 becomes degraded (i.e., its signal quality worsens). Regardless of the reason, when wireless device 20 needs to be served by another base station, it can only be handed-off to those base stations that are included in the neighbor list 50. Unlike existing techniques, however, the number of base stations included in the neighbor list 50 may not remain static as parameters associated with the wireless device 20, base station 10 and potential hand-off base stations 30a, ... 30n change.

In one embodiment of the present invention, one or more parameters associated with the wireless device 20 and base station 10 and between wireless device 20 and base stations 30a, ... 30n, are monitored and measured (collectively "measured") in real-time.

For example, suppose base station 10 measures its real-time call dropping rate parameter (a traffic flow criteria) and determines that it has surpassed a normal level, meaning too many calls are being dropped. In such a case, the present invention provides for varying the size of the neighbor list 50 to decrease the call dropping rate while maintaining current operating load levels. Similarly, the neighbor list 50 can be varied to meet acceptable call blocking rates (another traffic flow criteria). For example, shortening the neighbor list may mean that calls, which are connected to base station 10, may be handed-off to fewer base stations 30a, ... 30n which have been previously ranked, by techniques known in the art, as being the best base stations to handle such hand-offs. Because the neighbor list 50 can be narrowed to only those base stations 30a, ... 30n capable of handling such hand-offs, the number of actual calls being dropped should decrease (but the number of calls blocked might increase). Similarly, if the neighbor list of base stations within neighbor list 50 is increased, then the number of dropped calls may increase (but the number of calls that are blocked may decrease). In sum, depending on the measured call blocking and call dropping rates, the size of the neighbor list 50 can be varied to meet desired real-time traffic call blocking and call dropping levels/rates (i.e., traffic flow criteria). This adaptation process may be achieved by employing a Radio Network Controller (RNC) in a Universal Mobile Telecommunication System (UMTS) network or a Base Station Controller in a Global System for Mobiles (GSM) system, to give just a few examples. The control unit 60 usually has the responsibility of accepting new connections to a base station and is typically situated at the controller level in a CAC centralized approach or at the base station level in a CAC distributed approach.

Depending on the existing, real-time traffic flow criteria the list of potential hand-off base stations 50 may increase or decrease. For ease of explanation, FIG. 1 depicts an initial neighbor list 50 and a potential neighbor list 40, where the potential neighbor list 40 may be less than a maximum number of base stations included in the initial neighbor list 50. The initial neighbor list 50 is the list that is typically generated upon initiation (i.e., start-up) or during network maintenance. At any given time, the serving base station 10 may forward the neighbor list 40 to the wireless device 20. Because the potential list 40 represents an adaptation of initial neighbor list 50, the potential neighbor list 40 is not a static list as in existing techniques.

The discussion just concluded assumes that the initial neighbor list 50 is set at some maximum number of potential base stations. That is, even though the list of potential hand-off base stations 40 that is also stored by base station 10 and then sent to the mobile device 20 is variable, the initial, stored neighbor list size may not be changed and should not exceed a certain maximum. The benefit of maintaining an original, initial neighbor list is to ensure that the initial neighbor list is available to be used at a later time should traffic conditions so allow. It should be noted that after real-time traffic criteria are measured, the way the list is varied may differ from network to network. That is, the list may be changed by a network engineer (after receiving the results of any real-time traffic flow criteria measurements) visiting a base station or on the fly so to speak, as opposed to being changed automatically by the base station or network 1.

In another embodiment of the present invention, the size of the initial neighbor list 50 may be varied automatically (without human intervention) by the base station 10 (e.g., by control unit 60) executing one or more programs, for example, at predetermined time intervals. Because the size of the initial neighbor list 50 may be varied automatically by the base station, so may the size of the potential neighbor list 40. The lists may be varied substantially instantaneously as traffic flows improve or worsen (the list may be increased or decreased, respectively).

Though the neighbor list 40 might be expected to increase as traffic flows improve or decrease as such flows worsen, this need not always be the case. In other words, there may be situations where the size of the list increases or decreases without an associated improvement or degradation of traffic flows. That said, in general the size of the neighbor list may be increased under low traffic (loading) conditions and decreased under high traffic conditions.

At any given time, the potential list of base stations 40 may be equal to or less than the maximum number of base stations in the initial reference list 50 or may be equal to a variable number of base stations included in the neighbor list 40. Because the lists are so variable, they can be referred to as "adaptive" lists. It should be understood that the size of the neighbor list can be adapted to meet call blocking and call dropping rates acceptable to a given network operator under a given set of traffic conditions.

The above discussion has focused on varying a neighbor list based on changing traffic flows. The exact size of the list may be determined using a number of techniques or processes, one of which is illustrated by the flow diagram of FIG. 2.

Figure 2A:
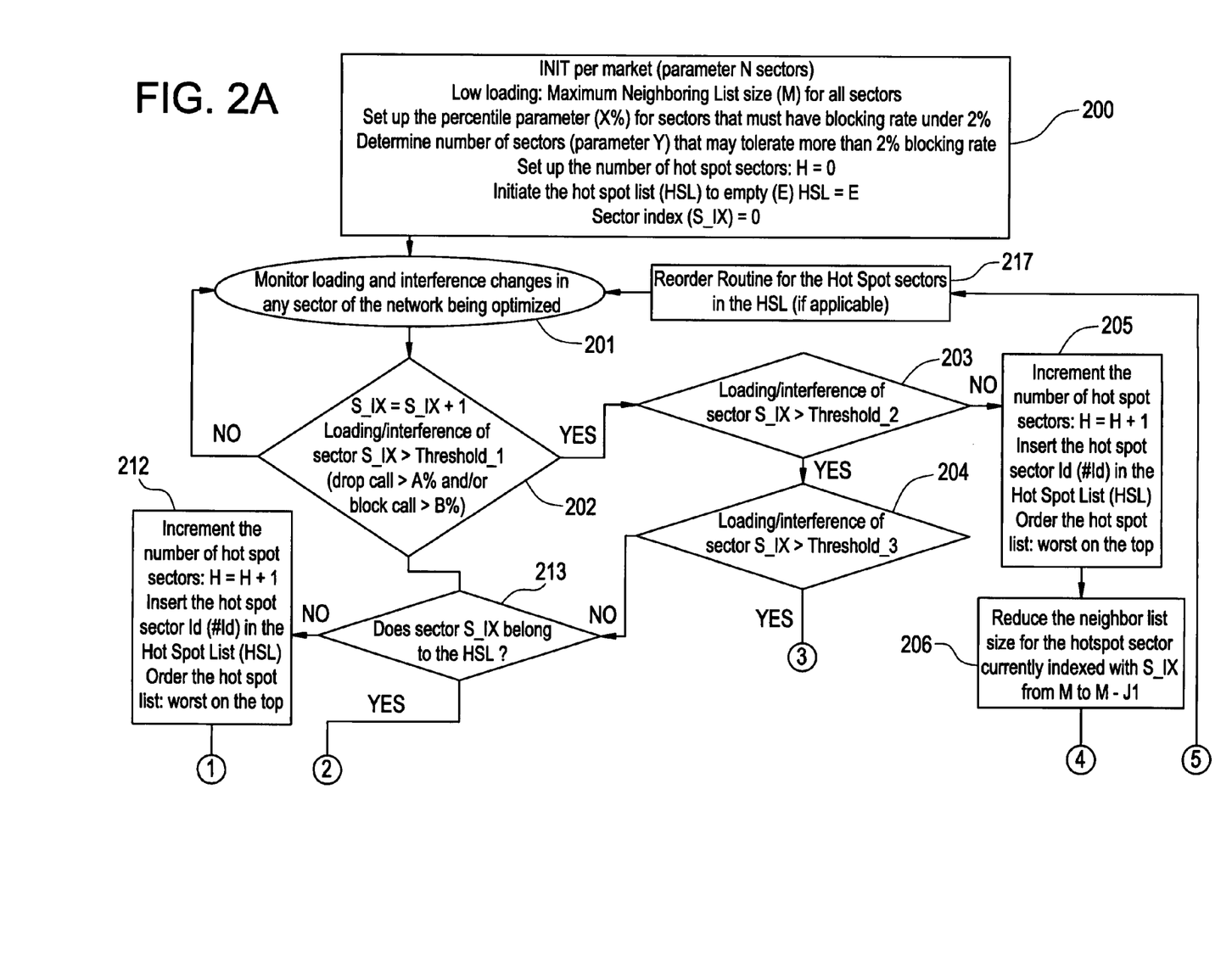
FIG. 2 depicts a flow diagram of a process for determining the size of a neighbor list according to one embodiment of the present invention.
Figure 2B:
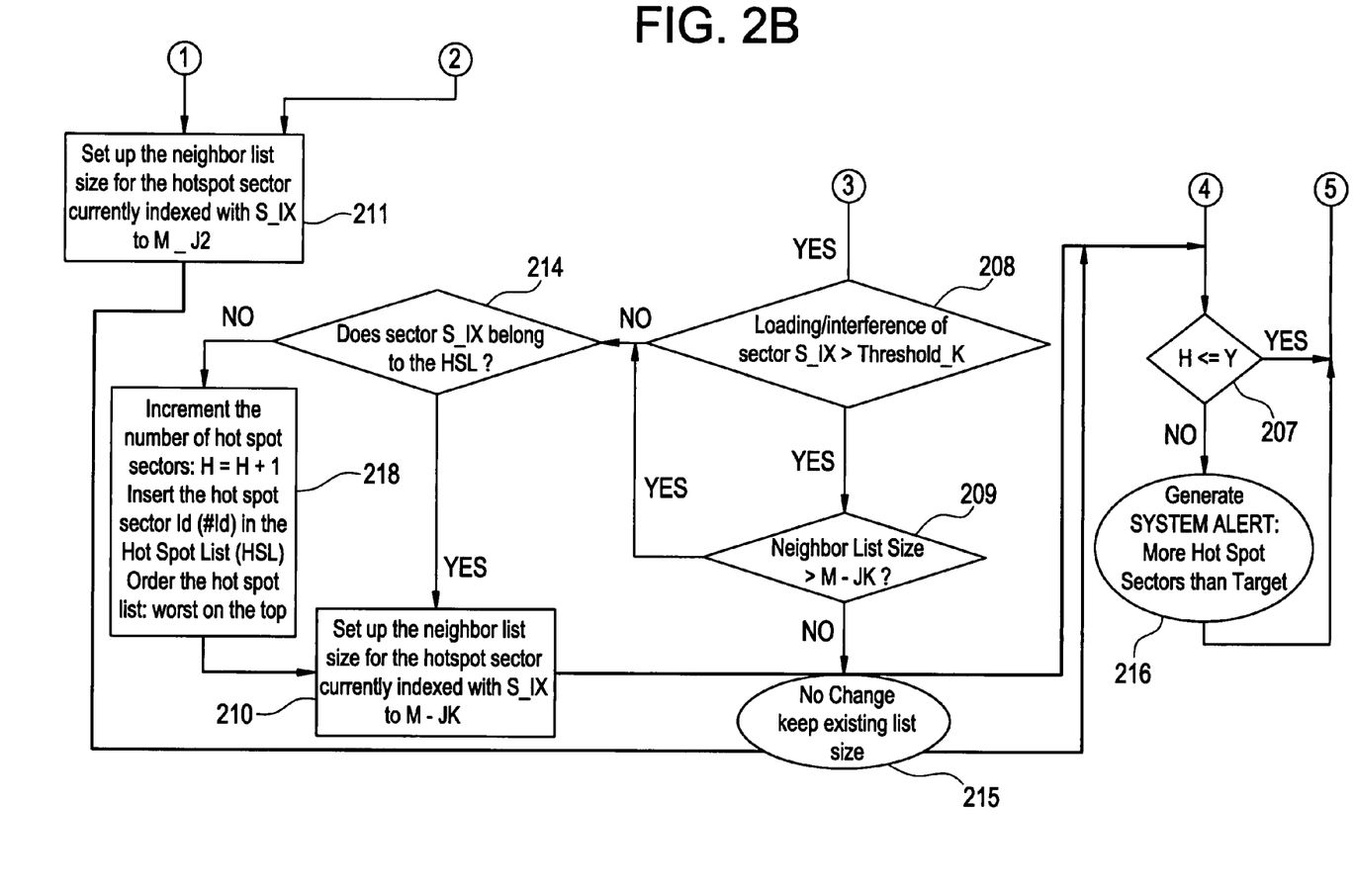

In one embodiment of the present invention, the size of the neighbor list is determined by comparing a real-time current load (i.e., traffic flows) of a base station, like base station 10, against threshold values (which those in the art may refer to as "switching points"). It should be noted that there may be one or more switching points depending on how much granularity is preferred.

In a further embodiment of the present invention, control unit 60 may comprise a CDMA, air interface controller which, for example, can be situated in an RNC in a UMTS network. The control unit 60 may be operable to continuously check the load on base station 10 in accordance with the steps shown in the flow diagram of FIG. 2.

For example, new call arrivals, whether originating at the base station 10 or handed-off from other base stations or cells, call departures, traffic fluctuations due to power changes via power control, etc. may all be continuously monitored and checked using the present invention.

Referring in more detail to FIG. 2, in a further embodiment of the present invention, a network operator may first specify a maximum neighbor list size, M, for every sector within its network at step 200. Those skilled in the art will recognize that the word "sector" usually means the area covered by a physical antenna of a base station. Because a base station may be equipped with multiple antennas that radiate energy in multiple directions, a base station can cover multiple sectors. The geographical area covered by a sector is the area where wireless mobile terminals are somehow connected to an antenna responsible for this area/sector. One example is a base station configuration, where the first sector spans from 0 to 120 degrees, the second from 120 to 240 and the third from 240 to 360 degrees. In wireless networks, neighboring sectors are designed to overlap one another in order to carry out hand-offs.

It is recognized by those skilled in the art that the traffic patterns may differ from sector to sector, even among sectors that belong to the same base station. For example, the first sector (e.g., antenna) of a base station may cover a highway area that has a heavily traffic load from 5 p.m. until 7 p.m., while the third sector of the same base station may cover a residential area that has a lower traffic load in general but sees an increase after 9 p.m. These sectors have different hand-off patterns and, consequently, their neighbor lists should be different. Because each sector is responsible for a different traffic flow, each sector may be associated with a different neighbor list (e.g., different in size and composition). The typical value for the maximum size of the list is 20 in CDMA and 32 in UMTS.

In another embodiment of the present invention, the neighbor list may be varied at a level below the sector level, for example, at the Radio Frequency (RF) carrier-sector level because multiple RF carriers can be supported by the same sector, and the distribution patterns across the network for these multiple carriers may be different. For example, in a wireless network operating using three RF carriers, the first RF carrier may be distributed across all sectors, the second one across 60% of the sectors while the third is distributed across 25% of the sectors. These differences in RF carrier distribution translate into different loading and interference patterns. Consequently, for a sector that is equipped with two RF carriers, the handover patterns between sectors may be different, thus requiring specific/customized neighbor lists for each RF carrier.

On the other hand, though it may be less efficient, a service provider may decide to vary a neighbor list at the base station level. The result is that a given neighbor list will be common to all sectors associated with the same base station, but it will differ from base station to base station.

To simplify an understanding of the invention, the term "base station" is meant to include all of the various levels, e.g., base station, sector, antenna or carrier level.

Referring again to FIG. 2, after selecting a maximum neighbor list size M, a network operator may select a percentage, X, at step 200 of the total number of sectors that must operate using a certain blocking rate (and dropping rate) that is typically specified by a Service Level Agreement, for example, under 2% (0.2% dropping rate). So, if the number of total sectors is 100 and the percent of sectors which must meet a blocking rate of 2% is 90%, X equals 90%. The percentage of sectors remaining, namely 10%, represents those sectors which may tolerate more than a 2% blocking rate. In accordance with one embodiment of the present invention, the number of sectors, Y, which may tolerate a particular blocking rate percentage is determined from this remaining percentage. For example, if 90% of all sectors must remain lower than a 2% blocking rate and the total number of sectors is 100, then 10% or 10 sectors will be allowed to have a blocking rate which exceeds 2%.

It should be understood that the values of M, X and Y are set by the network operator typically before a control unit, like control unit 60, begins to measure a call blocking or dropping rate.

As illustrated in the flowchart in FIG. 2, the present invention provides for measuring the load (e.g., call blocking rate) of each sector at step 201. Thereafter, at step 202, the load for a given sector is compared to a first threshold, e.g., a traffic load that generates a 2% blocking rate. If the load on a given sector exceeds this threshold, then the load is compared to a second threshold in step 203 before the size of the neighbor list is reduced at step 206. If, however, the load on a given sector is below a first threshold, then the present invention provides for selecting the next sector in order to measure its traffic load and compare the load against a similar threshold(s). It should be understood a sector's current load is known due to regular monitoring process set up within the network. Otherwise, measurements must be made to determine the actual sector load and interference values.

Suppose, however, that the load on a given sector exceeds a first threshold but does not exceed a second threshold. In this case, the neighbor list of the given sector is reduced from M to M-J1 in step 206.

It may occur that the load of a given sector exceeds the second threshold. If this is the case, the load is compared to a third threshold in step 204 prior to reducing a neighbor list of the sector. Similarly, as discussed above, if the load does not exceed a third threshold, then the neighbor list is set in step 210 to a value of M-J2. If the load exceeds a third threshold, then it is compared to a next threshold. This process continued until a load either falls below a given threshold or is compared to a last threshold. In a further embodiment of the present invention, the neighbor list is increasingly decreased as the measured load exceeds a higher or next threshold (e.g., when the load exceeds a fourth threshold a neighbor list is decreased to a size that is smaller than a neighbor list of a load which only exceeds a lower threshold, i.e., a first, second or third threshold).

In general, it can be said that FIG. 2 provides for a comparison of a current traffic load of a sector to a threshold and then, depending on the results of this comparison, the neighbor list associated with the sector is varied depending on the threshold that was exceeded, if any.

The process for varying a neighbor list shown in FIG. 2 measures the load in all sectors of a network (wireless market) serially. It should be understood that depending on the implementation selected, this process may be set up in parallel to allow the neighbor list size of each sector or multiple sectors to be varied simultaneously and at any time, if necessary. In a further embodiment of the invention, in order to adjust the neighbor list size, the load and/or interference value of each sector is compared to different threshold values.

It should be understood that the number of thresholds may vary depending on choices made by a network operator. For instance, a network operator may decide to use only one threshold in one market but four thresholds in another market.

In yet a further embodiment of the present invention, the number of thresholds may be changed over time. For example, a network may start operating with four thresholds but use only two thresholds after a while (after two days) then use three thresholds three hours later. The threshold values may also change over time. For example, a first threshold may be originally set to a traffic loading value that corresponds to a 2% blocking rate, then after a while (e.g., the next day) be set to a traffic loading value that corresponds to 1% blocking rate. A second threshold may first be set at a traffic loading value that corresponds to 5% blocking rate, then (e.g. after five hours) to a traffic loading value that corresponds to 3% blocking rate, and so on.

In yet another embodiment of the present invention, depending on the decision criteria and data being used, the size of the neighbor list associated with a specific threshold may change over time even though the corresponding threshold value may not change. For example, when a 2% blocking rate is reached, the associated neighbor list size may first decrease from a maximum size, say 20, to 15. After a while (e.g., the next day, after three hours, a week), because the traffic pattern may have changed, the neighbor list size may decrease from the maximum size of 20 to 18 or 12 upon reaching the 2% blocking rate. The same rationale applies to other thresholds as well.

In still further embodiments of the present invention, the variation of a neighbor list may be controlled using hysteresis-like techniques to prevent call blocking and dropping rates from fluctuating wildly. For example, if the size of a list is decreased from 20 potential hand-off base stations to 5, increasing it up to 20 again immediately after traffic flows improve (e.g., little congestion) might result in congestion again, which might trigger a decrease in the neighbor list; a vicious circle of large swings in list size which correlate to undesirable large swings in call blocking and dropping rates. Instead of allowing the neighbor list to return to an original size, the present invention provides for varying the size of the neighbor list, by the control unit 60 for example, so that the size is set somewhat below the initial size to prevent a return to an overload condition.

Figure 3:
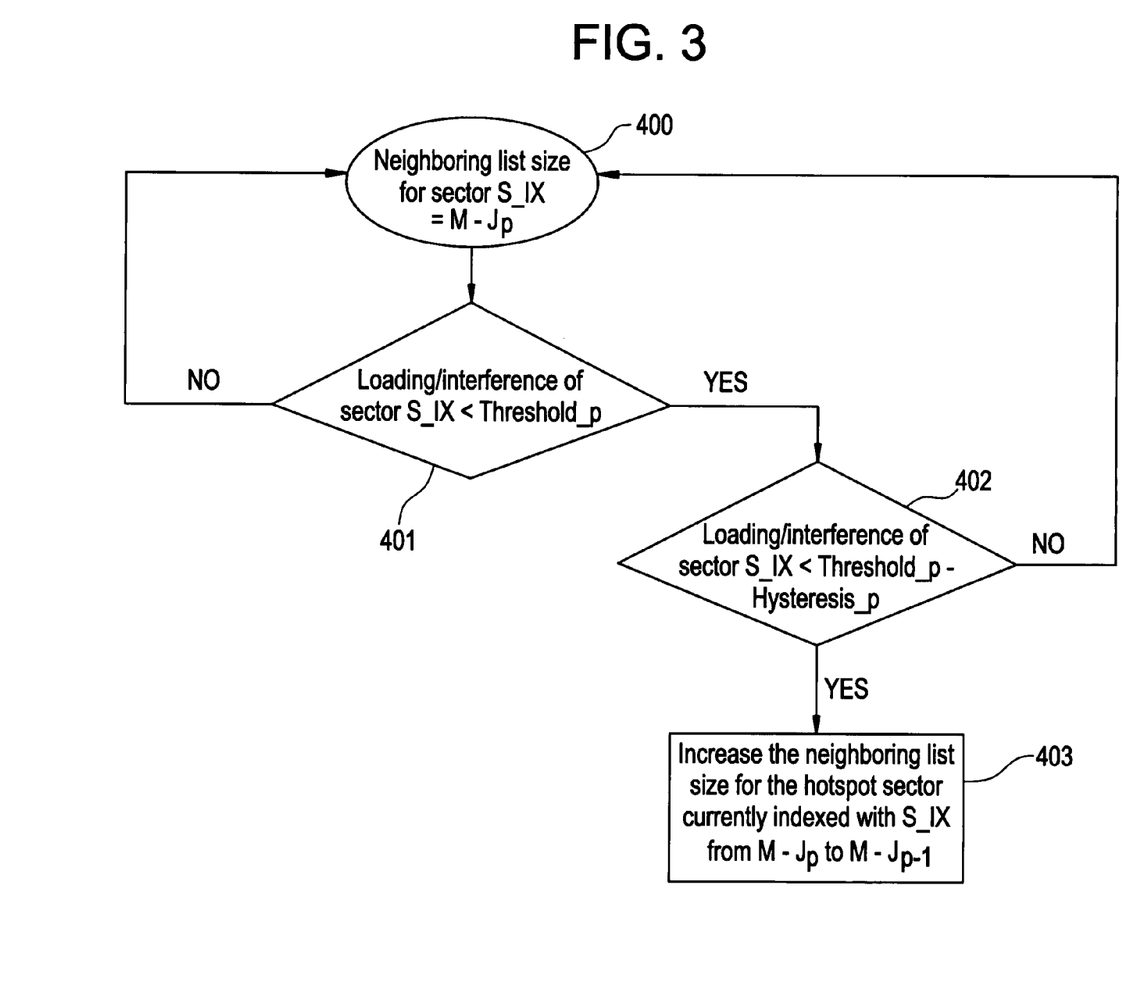
FIG. 3 depicts a flow diagram of a hysteresis technique according to one embodiment of the present invention.

FIG. 3 depicts a flow diagram of a hysteresis mechanism according to one embodiment of the present invention. In this example, the size of a neighbor list is increased from $M-J_p$ to $M-J_{p-1}$, but not at the threshold value Threshold_p that was used to reduce the size of the list from $M-J_{p-1}$ to $M-J_p$ when the load on a base station was increasing. Indeed, it is increased using a lower load value than Threshold_p, namely at Threshold_p-Hysteresis_p. Hysteresis_p is a hysteresis parameter at the step "p". If the hysteresis parameters are set to 0, no hysteresis mechanism is activated.

Figure 4:
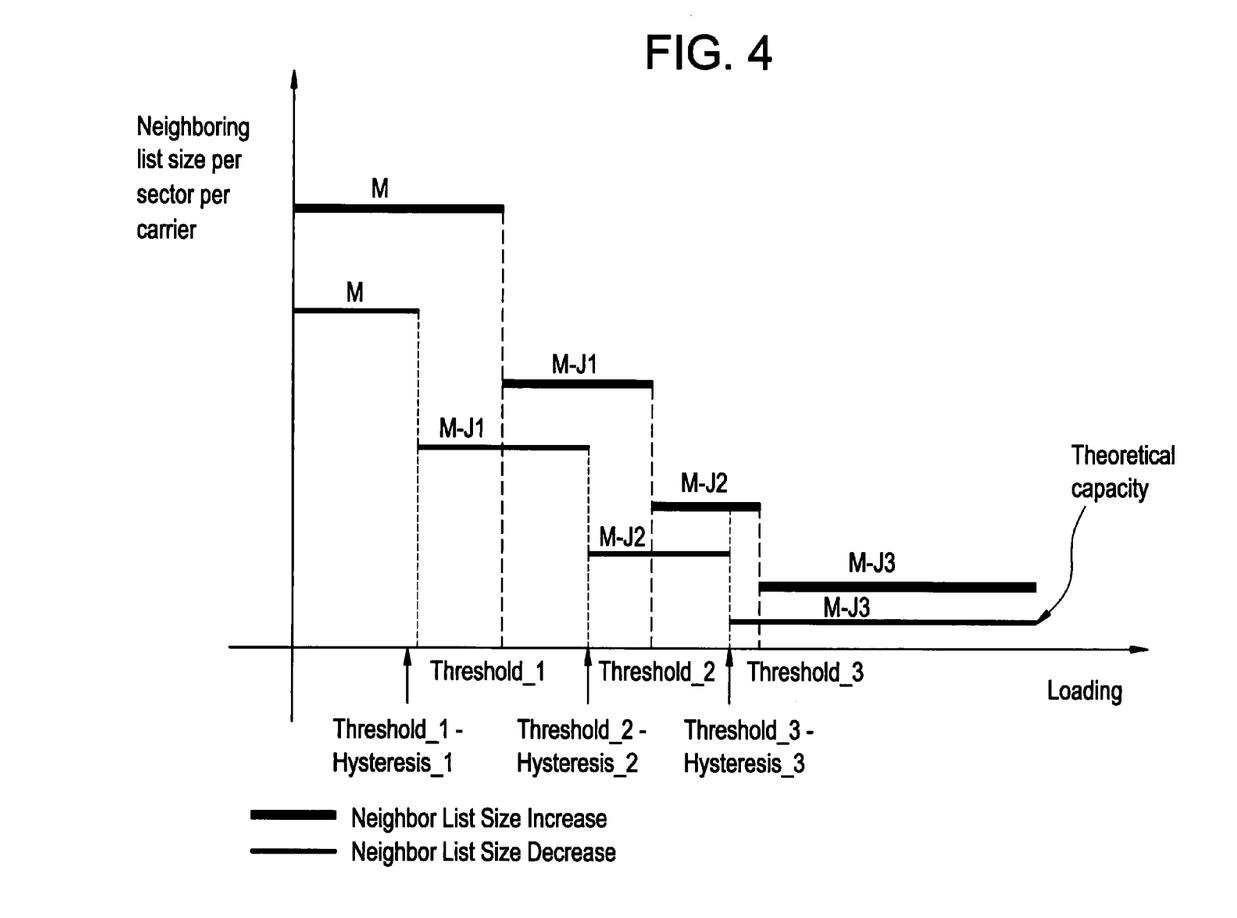
FIG. 4 depicts relative neighbor list sizes that may be selected based on traffic loads according to one embodiment of the present invention.

FIG. 4 depicts relative neighbor list sizes from M to M-J3 that may be selected based on increasing or decreasing (hysteresis) traffic loads according to embodiments of the present invention.

An adaptable neighbor list provides a number of advantages over existing systems. For example, a network may be capable of handling higher traffic loads if such a network operates with a call blocking rate greater than 2% but with a call dropping rate less than 1% (or ideally 0.2%) resulting in higher network utilization factors. Better link (pathways 12a, 12b, . . . 12n) quality may be related because unacceptable pilot signals need not be measured during high traffic periods resulting in a reduction in signaling and an increase in battery life for wireless devices. These are just two of the many advantages provided by the present invention.

In an additional embodiment of the present invention, instead of measuring traffic flow criteria, pilot signals of these base stations in a neighbor list may be measured to enable hand-offs.

For example, the mobile device 20 may measure current serving pilot signal 12 and other pilot signals from base stations 30a, . . . 30n while the current serving base station 10 may measure link 12. If a hand-off is required, a connection is made between the wireless device 20 and one of the base stations 30a, . . . 30n. Though only one connection 21 is shown, it should be understood that wireless device 20 may be handed-off to any one of the base stations 30a, . . . 30n over a different connection. For purposes of the present invention, it will also be assumed for now that each of the base stations 30a, . . . 30n is a base station which may be included in the neighbor list 50.

Though the wireless device 20 may be handed-off to any of the potential base stations 30a, . . . 30n which are included in the neighbor list 50, the present invention provides for limiting the number of hand-off base stations 30a, . . . 30n. For example, after pilot signals associated with base stations 30a, . . . 30n included in the neighbor list 50 are measured, they are compared to an acceptable pilot signal level. Thereafter, control unit 60 or another unit within device 20 (or 10) is operable to identify those pilot signals that meet or exceed the acceptable level. Only those base stations that are associated with an identified, acceptable pilot signal level will remain as potential base stations. The level may be referred to as an "adaptable" level because the criteria for deciding what is, and isn't, an acceptable pilot signal level may vary from network operator to network operator. The net result is this: if a pilot signal level associated with a potential hand-off base station 30a, . . . 30n does not meet an acceptable level, the base station is no longer a potential, hand-off base station. That is, the control unit 60 will prevent a hand-off of the wireless device 20 to any base station on the list whose pilot signal level is unacceptable. The wireless device 20 may enable a hand-off only to those base stations 30a, . . . 30n associated with an identified, acceptable pilot signal level. The other restriction placed on the selection of a base station to carry out a hand-off is that such a selection must not create a swing in call dropping or call blocking rates. To prevent this from happening, the base station selected must not only have an acceptable pilot signal but must also come from a list of base stations that prevents a return to an overload condition.

Though in most instances the wireless device 20 will be operable to carry out the measurement of the pilot signal, in some instances these measurements may be carried out by the serving base station 10. In contrast, either the wireless device 20 or serving base station 10 may be operable to enable a hand-off between the wireless device 20 and new, hand-off base station or stations 30a, . . . 30n (again, a hand-off may include more than one base station if network 1 utilizes, for example, CDMA technology and soft hand-offs). The discussion just finished may be referred to as "effectively" limiting the number of potential base stations in the neighbor list 50. That is, no change was actually made to the number of base stations making up the neighbor list 50 that may be used by the control unit 60. Instead, the neighbor list was changed by restricting hand-offs to only those base stations associated with an acceptable pilot signal and by preventing swing effects in call block and/or call drop rates.

The discussion above has attempted to set forth some examples of the present invention. These examples are not intended to limit the scope of the present invention whatsoever. The scope of the present invention is better defined by the claims which follow.

We claim:

1. A method implemented in a controller for setting a number of base stations that can be considered hand-off base stations comprising the steps of:

measuring real-time traffic flow criteria associated with one or more base stations; and setting a number of base stations, from a list of potential hand-off base stations, that can be considered hand-off base stations to a number that is below an initial number to prevent undesired fluctuations in call blocking and call dropping rates depending on the measured traffic flow criteria and traffic-based hysteresis parameters;

further comprising the step of maintaining an initial neighbor list and generating an adaptable neighbor list of potential hand-off base stations based on traffic flows and traffic-based hysteresis parameters.

2. The method as in claim 1 wherein the number of base stations included in the neighbor list of potential hand-off base stations is less than a maximum number of base stations included in an initial neighbor list.

3. The method as in claim 1 further comprising the step of forwarding the adaptable neighbor list to a wireless device.

4. The method as in claim 1 wherein a wireless device is operable to enable a hand-off.

5. The method as in claim 1 wherein at least one base station on the list is operable to enable a hand-off.

6. A system for setting a hand-off base station list, operable to:

measure real-time traffic flow criteria associated with one or more base stations; and set a number of base stations, from a list of potential hand-off base stations, that can be considered hand-off base stations, to a number that is below an initial number to prevent undesired fluctuations in call blocking and call dropping rates depending on the measured traffic flow criteria and traffic-based hysteresis parameters;

further comprising the step of maintaining an initial neighbor list and generating an adaptable neighbor list of potential hand-off base stations based on traffic flows and traffic-based hysteresis parameters.

7. The system as in claim 6 wherein the number of base stations included in the neighbor list of potential hand-off base stations is less than a maximum number of base stations included in an initial neighbor list.

8. The system as in claim 6 comprising a control section operable to forward an adaptable neighbor list to a wireless device.

9. A system for setting a hand-off base station list comprising:

means for measuring real-time traffic flow criteria associated with one or more base stations; and means for setting a number of base stations, from a list of potential hand-off base stations, that can be considered hand-off base stations to a number that is below an initial number to prevent undesired fluctuations in call blocking and call dropping rates depending on the measured traffic flow criteria and traffic-based hysteresis parameters;

further comprising the step of maintaining an initial neighbor list and generating an adaptable neighbor list of potential hand-off base stations based on traffic flows and traffic-based hysteresis parameters.

* * * * *